US008553723B2

(12) United States Patent
Clerget et al.

(10) Patent No.: US 8,553,723 B2
(45) Date of Patent: Oct. 8, 2013

(54) METHOD AND DEVICE FOR PROCESSING A DVB-H COMPLIANT TRANSPORT STREAM

(75) Inventors: Antoine Clerget, Mougins (FR); Patrick Cipiere, Antibes (FR)

(73) Assignee: UDCAST (FR)

( * ) Notice: Subject to any disclaimer, the term of this patent is extended or adjusted under 35 U.S.C. 154(b) by 1510 days.

(21) Appl. No.: 11/257,474

(22) Filed: Oct. 24, 2005

(65) Prior Publication Data

US 2007/0074267 A1 Mar. 29, 2007

(30) Foreign Application Priority Data

Sep. 23, 2005 (EP) .................................... 05 291979

(51) Int. Cl.
*H04J 3/24* (2006.01)
*H04J 3/00* (2006.01)

(52) U.S. Cl.
USPC ........... 370/476; 370/509; 370/516; 370/104; 370/474; 370/331; 455/31.1; 455/307

(58) Field of Classification Search
USPC ........... 370/476, 509, 516, 13, 104, 389, 392, 370/350, 503, 331, 474; 375/240.25; 725/136; 455/31.1, 307
See application file for complete search history.

(56) References Cited

U.S. PATENT DOCUMENTS

| | | | | |
|---|---|---|---|---|
| 3,601,536 | A * | 8/1971 | Calfee | 348/470 |
| 4,606,019 | A * | 8/1986 | Takai | 370/321 |
| 5,570,352 | A * | 10/1996 | Poyhonen | 370/330 |
| 5,909,639 | A * | 6/1999 | Takahashi | 340/7.55 |

(Continued)

FOREIGN PATENT DOCUMENTS

| | | | |
|---|---|---|---|
| EP | 0893913 | A1 | 1/1999 |
| EP | 0917355 | A1 | 5/1999 |
| WO | 2004066652 | A1 | 8/2004 |

OTHER PUBLICATIONS

European Broadcasting Union, "Digital Video Broadcasting (DVB); DVG-H Implementation Guidelines," ETSI TR 102 377 v1.1.1 (Feb. 2005).

(Continued)

*Primary Examiner* — Andrew Chriss
*Assistant Examiner* — Jamal Javaid
(74) *Attorney, Agent, or Firm* — Lerner, David, Littenberg, Krumholz & Mentlik, LLP

(57) ABSTRACT

According to a first aspect, the invention proposes a method for processing a transport stream (TS) received as an input transport stream in a processing device (SDR), the transport stream comprising a plurality of elementary streams (ES), each elementary stream (ES) being a set of transport stream packets having the same Packet IDentifier (PID), at least one of these elementary streams being time-sliced so as to be sent in bursts, timing information indicating within a burst the time to the beginning of the next burst, characterized in that it comprises the steps of:

applying a filtering operation to the input transport stream so as to filter out from the input transport stream part or all of one or more time-sliced elementary streams;

modifying the bursts scheduling of the input transport stream so as to generate a DVB-H compliant output transport stream from the filtered input transport stream.

The invention also relates to a device for processing a transport stream comprising a plurality of time-sliced elementary streams, said device means for performing the method according to the first aspect of the invention, and to a transport stream carrying in-band configuration messages intended to be interpreted by the device for determination of the filtering operation to be applied to the input transport stream.

21 Claims, 3 Drawing Sheets

(56) References Cited

U.S. PATENT DOCUMENTS

| | | | | |
|---|---|---|---|---|
| 6,002,687 | A | 12/1999 | Magee et al. | |
| 7,212,551 | B1 * | 5/2007 | Beshai et | 370/509 |
| 7,336,646 | B2 * | 2/2008 | Muller | 370/350 |
| 7,486,640 | B2 * | 2/2009 | Borsos et al. | 370/331 |
| 2004/0165586 | A1 * | 8/2004 | Read et al. | 370/389 |
| 2005/0232223 | A1 * | 10/2005 | Muller | 370/350 |

OTHER PUBLICATIONS

European Broadcasting Union, "Digital Video Broadcasting (DVB); Transmission System for Handheld Terminals (DVB-H)," ETSI EN 302 304 v1.1.1 (Nov. 2004).

International Search Report, PCT/US2006/066603, dated Dec. 8, 2006.

* cited by examiner

METHOD AND DEVICE FOR PROCESSING A DVB-H COMPLIANT TRANSPORT STREAM

CROSS REFERENCE TO RELATED APPLICATIONS

The present application claims the benefit of European Patent Application No. 05291979.2, filed on Sep. 23, 2005.

BACKGROUND OF THE INVENTION

The present invention pertains to communication systems, and more precisely to communication systems carrying multimedia services to handheld terminals over digital video broadcasting (DVB) networks.

Internet Protocol DataCasting (IPDC) combines IP-based data transmission with digital broadcasting to enable distributing multimedia content to a large group of users.

In particular, DVB-H (DVB Handheld) standard compliant solutions allow for the delivery of multimedia content, such as IP-TV, to mobile devices.

The following references from the European Telecommunication Standard Institute (ETSI) notably apply for the DVB-H system:

ETSI EN 302 304: <<Digital Video Broadcasting (DVB); Transmission System for Handheld Terminals (DVB-H)>>;

ETSI TR 102 377: <<DVB-H Implementation Guidelines>>;

as well as the various references cited in these documents.

A typical DVB-H network is a Multiple Frequency Network (MFN) comprising multiple coverage areas (or cells), each of these areas being of the Single Frequency Network (SFN) type.

FIG. 1 represents such a DVB-H network.

Three cells C1, C2, C3 are shown which each use several transmitters T. All the transmitters within a cell receive the common to the cell DVB Transport stream through a regular distribution network DN, and modulate and broadcast this Transport stream on the same one frequency.

The network is said to be MFN in that neighbouring cells C1, C2, C3 use different transmission frequency channels F1, F2, F3. In particular, the use of different frequency channels in neighbouring cells gives the possibility to run local content in each cell. For instance, local TV programs can be broadcasted in each cell.

Associated with the transmitters are repeaters R that may be used to fill in shadows in the reception pattern, and to improve coverage on critical areas where reception performance is insufficient. A DVB-H repeater operates at RF level and receives a DVB-H emission from the air at a certain frequency (i.e. the transmission frequency used within the cell where the repeater is located), amplifies the received emission and retransmits it in the same frequency.

An IP-backbone is responsible for delivering the multimedia content (IP datagrams) to the different cells C1, C2, C3.

In each cell, an IP Encapsulator (IPE) is commonly used which acts as an interface between a broadcast source (via the IP backbone) and the distribution network DN distributing the content to the different transmitters within the cell.

The IP data to be broadcasted are inserted into PES (Program Elementary Stream) packets mapped into MPEG-2 (Movie Pictures Expert Group) TS (Transport Stream) packets, as defined in MPEG-2 Systems ISO/IEC 13818-1.

The IPE thus prepares the delivery of MPEG-2 TS from the IP datagrams it receives from the IP-backbone.

The IPE takes the responsibility for encapsulating the incoming IP-datagrams into MPE (MultiProtocol Encapsulation) sections, these MPE sections being afterwards segmented to fit in MPEG-TS packets.

The IPE also adds the required PSI/SI (Program Specific Information/Service Information) signalling data.

The IPE also includes time slicing technologies for sending data in bursts, along with MPE timing information which allows for indicating to the receiver when to expect the next burst (the relative amount of time from the beginning of this MPE frame to the beginning of the next burst being indicated within a burst in the header of each MPE frame). This enables the handset to shut down the receiver between bursts, thereby minimizing power consumption and preserving battery life.

Other time-slicing signalling information, such as burst duration, are included in the time_slice_fec_identifier_descriptor in the INT (IP/MAC Notification Table). Some of this information is also sent within Transmission Parameters Signaling (TPS) bits that are transported by dedicated carriers (TPS Pilots) in the COFDM (Coded Orthogonal Frequency Division Multiplexing) signal so as to be more quickly and easily available by the receivers (which thus do not need to decode MPEG2 and PSI/SI info).

The IPE can also introduce an additional level of correction at the MPE layer by generating MPE-FEC (MultiProtocol Encapsulation-Forward Error Correction) frames. The objective of the MPE-FEC is to improve the carrier to noise ratio (C/N) and Doppler performance in mobile channels and to improve the tolerance to impulse interference.

A SFN adapter is responsible for forming time-stamped groups of frames (named megaframes) and sending them on a distribution network to the transmitters of the cell, thus allowing for the modulators associated with the transmitters to be accurately synchronized and to deliver the same bits in the same COFDM carriers at the same time. All the transmitted signals are thus identical which allows for the simultaneity of reception of the information by all the listening users.

In particular, GPS receivers may be used to provide a time reference for SFN synchronization.

A megaframe (see ETSI TS 101 191) consists in a group of n TS-packets or RS-packets (TS-packets with OFDM Reed Solomon coding information added), where n is an integer number, which depends upon the number s of RS-packets per OFDM superframe in the DVB-T transmission mode which is used (see EN 300 744 sub clause 4.7). In the 8K mode $n=s\times2$, in the 4K mode $n=s\times4$, in the 2K mode $n=s\times8$. The first packet of a megaframe has an inverted sync byte.

A megaframe comprises a synchronization mark known as a megaframe Initialization Packet (MIP). A MIP is an MPEG2 packet with a dedicated (0x15) PID (Packet IDentifier) value. The MIP of a megaframe of index M allows to uniquely identifying the starting point of the megaframe of index M+1.

A MIP carries information to transmitters concerning the position of the first packet of the next megaframe in the Transport Stream (expressed in number of MPEG-2 TS-packets), timing information (with a 100 ns accuracy) indicating to the modulator when the modulation of next megaframe must be started, configuration values for modulation and transmission parameters (mode, guard interval, cell identifier, etc.) that the modulators must send in the TPS carriers, and finally, thanks to the function parameters, specific values such as time and frequency offsets, transmission power, cell identifier, . . . for a given transmitter or all the transmitters.

Timing information included in MIP are mainly the synchronization_time_stamp (STS) and the maximum_delay, both expressed in 100 ns units.

STS contains the time difference between the latest pulse of the “one-pulse-per-second” reference that precedes the start of the megaframe M+1 and the actual start (in the SFN adapter) of this megaframe.

The maximum_delay field contains the time difference between the time of emission of the start of megaframe M+1 by the antennas of all the transmitters in the cell and the start of megaframe M+1 at the SFN adapter. The value of maximum_delay shall be larger that the sum of the longest delay in the distribution network DN and the delays at the modulators, power transmitters and antenna feeders. The maximum value of maximum_delay is 1 second. A transmitter receiving the start of a megaframe at Trec (expressed in 100 ns units relative to the current pulse of the one pps reference) delays this megaframe by Tdelay=(STS+maximum_delay−Trec) modulo $10^7$.

SFN Adapters are usually placed in each cell behind an IPE or a Multiplexer, but the SFN Adapters capabilities can be included in the IPE or in the Multiplexer itself.

However other network topologies can be contemplated. For instance, the IP datagrams, instead on being encapsulated locally at a local IPE, may be encapsulated centrally and distributed within a centrally produced transport stream to the sites where the final transport stream is produced and broadcasted.

Such a centrally encapsulated stream could also be time-sliced, both the encapsulation and the time-slicing being then centrally performed, using a “central IPE”. The task of the SFN adapter for the insertion of MIP synchronization marks within the transport streams could also be implemented centrally.

In this case, there is no need for a local IPE in each cell. Furthermore, the intra-cell distribution network (linking a local IPE to the various transmitters) is also not mandatory, as the centrally encapsulated and time-sliced stream can be delivered directly from the central IPE to the transmitters of the different cells, for instance via a satellite link.

It has to be noted that such a satellite delivery of a centrally produced content should be used in the future, for instance to respond to complexity, cost and coverage problems. Indeed DVB-H requires a denser transmitters network than DVB-T, and thus an existing DVB-T intra-cell distribution network has to be densified in order to answer DVB-H constraints. Of course, such a densification is complex and expensive. Furthermore, the deployment of DVB-H should be carried out by private companies, without public utility obligation. There is thus a risk that these companies concentrate on the zones with high population density, possibly leaving uncovered zones with low population density. In view of the above mentioned problems, satellite delivery is appreciable because of its ease and speed of implementation and of its low capital costs.

But a centrally generated DVB-H TS is common to the entire MFN network and the same programs are thus broadcasted in all the cells.

And the central IPE solution does not take advantage of the DVB-H network topology, and notably the fact that this network covers various geographical areas (the SFN cells).

An objective of the present invention is to take advantage of the DVB-H multiple SFN cells network topology despite the fact that the TS is centrally produced, and aims notably at providing a technique which would allow, starting from a centrally produced TS, for particular local TSs to be produced and synchronously distributed in each particular SFN cell.

For this purpose, and according to a first aspect, the invention proposes a method for processing a transport stream received as an input transport stream in a processing device, the transport stream comprising a plurality of elementary streams, each elementary stream (ES) being a set of transport stream packets having the same Packet IDentifier (PID), at least one of these elementary streams being time-sliced and sent in bursts, timing information indicating within a burst the time to the beginning of the next burst, characterized in that it comprises the steps of:

- applying a filtering operation to the input transport stream so as to filter out from the input transport stream part or all of one or more time-sliced elementary streams;
- modifying the bursts scheduling of the input transport stream so as to generate a DVB-H compliant output transport stream from the filtered input transport stream.

According to a second aspect, the invention proposes a device for processing a transport stream comprising at least one time-sliced elementary streams, characterized in that it comprises means for performing the method according to the first aspect of the invention.

BRIEF DESCRIPTION OF THE DRAWINGS

Other characteristics, purposes and advantages of the invention will appear to the reading of the following detailed description, with respect to the annexed drawings, given as non restrictive examples, in which, in addition to the already discussed FIG. 1.

DETAILED DESCRIPTION OF THE PREFERRED EMBODIMENTS

The present invention deals with a process and device for processing a DVB-H compliant transport stream.

However the invention is in no way limited to such a DVB-H compliant transport stream but extends, as it will be apparent from the following description, to any transport stream comprising a plurality of elementary streams, some of these elementary streams being time-sliced so as to be sent in bursts, timing information indicating within a burst the time to the beginning of the next burst.

The invention also relates to a transport stream carrying in-band configuration messages to be interpreted by such a device.

The invention in particular applies to a DVB-H network comprising multiple SFN cells in the case of a DVB-H compliant MPEG-2 Transport Stream (TS) being centrally produced.

In such a network, the DVB-H compliant TS, time-stamped using MIP, is thus delivered at a rate Bip to the various cells, and all the timings in DVB-H elementary streams and in MIP packets are computed taking in account this rate Bip.

The TS comprises a plurality of DVB-H compliant Elementary Streams (ES), an ES being a set of transport stream packets having the same Packet IDentifier (PID).

The TS also comprises different tables, and may also comprise classical MPEG-2 streams.

Each DVB-H elementary stream carries MPE sections and is time-sliced for the MPE sections to be sent in bursts. MPE timing information indicates within a burst the time to the beginning of the next burst.

The invention proposes to replace the transmitters classically used within the cells of a DVB-H network by processing devices (referred to Smart Digital Repeaters—SDR) according to the second aspect of the invention.

An exemplary embodiment of such a SDR is detailed hereafter. This description is also intended to describe an exemplary embodiment of the process according to the first aspect of the invention.

Figure 4:
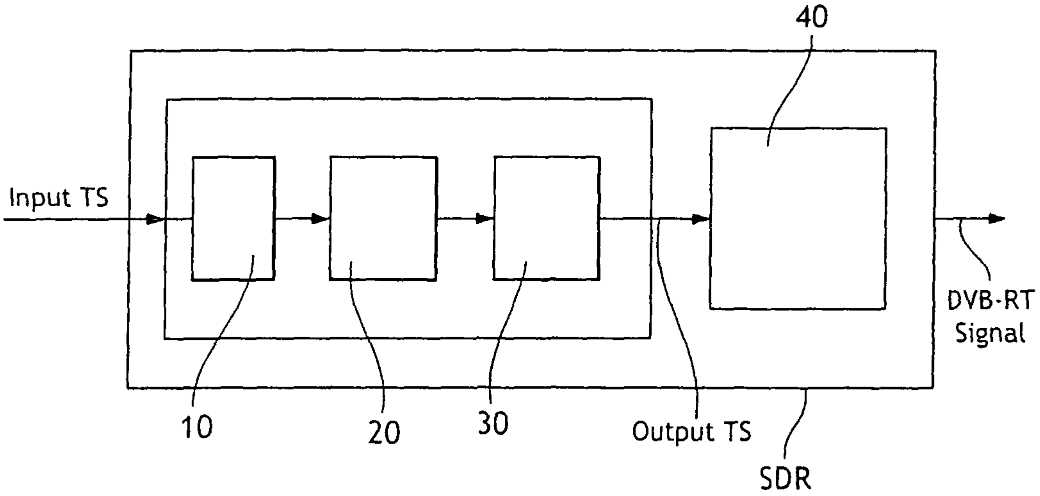
FIG. 4 represents a possible embodiment of the device according to the second aspect of the invention.

As represented on FIG. 4, the SDR comprises means 10 for receiving as input the centrally produced DVB-H compliant TS (input TS), at an input rate Bip.

As already mentioned above, in a more general way, the invention extends to an input TS comprising a plurality of time-sliced elementary streams, and notably to such an input TS from which a DVB-H compliant TS can be formed, typically by desencapsulation of the input TS.

For instance, the input may be MPEG-2 packets over ASI or MPEG-2 packets over IP or over UDP/IP, via any medium (for instance Ethernet, ATM, Adsl, DVB-S/frame relay, etc.), and possibly encoded or compressed, etc.

Bip is the original TS bit-rate, once desencapsulated, deciphered, decompressed.

These means 10 may comprise demodulation means for receiving a DVB RF signal and recovering from the RF signal the MPEG-2 transport stream packets forming the input transport stream.

The means may also comprises means for extracting the TS from the medium, for decompressing and deciphering it, etc. as well as means for suppressing the inverted sync bytes.

The SDR can comprise means for decrypting the encrypted parts of the input transport stream.

The SDR comprises means 20 for applying a filtering operation to the input TS, so as to filter out from the input TS part or all of one or more time-sliced elementary streams.

The filtering operation may consist in filtering out from the input transport stream one or more elementary streams, these elementary being identified by their respective PID (this filtering operation can be referred to as PID filtering).

The filtering operation may also consist in filtering out from the input transport stream part of an elementary stream, this part being for instance identified thanks to IP addresses in the MPE sections (this filtering operation can be referred to as IP address filtering).

The input transport stream may also be modified so as to perform the following operations (non exhaustive list):

- PID translation consisting in updating the PID field with a new PID value;
- IP addresses translation in MPE/IP sections consisting in updating the source and destination IP addresses of MPE sections;
- DVB object's value translation (for instance network name, network_id, TSID, cell_ID, etc.);
- Burst remodelling: such as Burst suppression, Burst moving, Burst multiplexing, Burst demultiplexing, Burst insertion;
- MIP and megaframe updating;
- ESG (Electronic Service Guide) updating in order to reflect addresses translation and traffic filtering;
- PSI/SI tables updating;
- Transport stream compression/decompression (such as for instance NULL suppression, DVB compression or IPComp (IP Payload Compression Protocol) and ROHC (RObust Header Compression) when the MPEG-2 input stream is sent over IP).

The general format of the envelope of the input DVB-H stream can be described by:

$$\sum_{i\in All} B_{i}.(I(t-s_i)-I(t-e_i))=B_{input}$$

where Bi is the bandwidth of burst i, t the time, si the start-time of burst i, ei the end-time of burst i, and I the sign function (I(t)=1 if t>0, I(t)=0 if t<0).

The above formula also applies when the input TS also carries non time sliced ES, taking si as the absolute start time of the non time-sliced ES (zero if unknown) end ei as the end time of the non time-sliced ES (or infinity if unknown).

The SDR filter part or all of one or more elementary streams. The resulting transport stream has a rate below the constrained output bitrate $B_{output}$, the rest being filled with NULL packets.

$$\sum_{i\in(Partially)Filtered-PIDs} B_{i}.(I(t-s'_i)-I(t-e'_i))\leq B_{output}$$

The SDR further comprises means 30 for modifying the burst scheduling of the input transport stream and for enforcing megaframe and MIP coherence, so as to generate a DVB-H compliant output transport stream (output TS), at an output rate Bo, from the filtered input transport stream.

When generating the output DVB-H transport stream, the SDR modifies the burst scheduling in the filtered bursts. For a given elementary stream, the starting date $s'_i$ of the next burst of this elementary stream has notably to be determined.

The SDR may also comprise modulation and transmission means 40 adapted to convert the generated output MPEG-2 transport stream into a DVB RF signal for transmission at the cell's frequency.

According to a first embodiment, the invention proposes to modify the burst scheduling by updating the MPE timing information in the bursts of the output transport stream.

This updating is made possible thanks to the following properties:

- MPE timing information is relative (time relative to the beginning of the next burst);
- MPEG-2 packets have a fixed length;
- time needed to transmit an MPEG-2 Packet can be derived from the rate Bo, said rate Bo being itself derived from the transmission parameters that apply to a given SDR.

According to this first embodiment, the MPE timing information to be set for a burst B of an elementary stream in the output TS is computed from the interval separating said burst B and the next burst B+1 of said elementary stream in the input transport stream received by the SDR.

The updating of the MPE timing information of each burst can for instance be performed by the steps of:

- receiving at the SDR a burst B of an elementary stream of the input stream;
- delaying the output of said burst B in the output stream until the next burst of said elementary stream is received at the SDR;
- detecting the arrival of said next burst in the input stream and calculating the interval (amount of time or of data) separating said bursts;
- computing, from said interval, the MPE timing information to be set for said burst B in the generated output transport stream.

The implementation of this first embodiment has the advantage of keeping the structure of the transport stream while updating the MPE timing to accurate values.

Since the maximum burst interval between two bursts in a DVB compliant TS is 40.96 seconds, the delay added to an elementary stream has to be at least equal to this maximum expected inter-burst delay.

The delay added to an elementary stream is a fixed system parameter, that is a parameter which is not dynamically evaluated (for instance based upon the MPE timings at start time). There is indeed a risk that different SDRs, starting at different times, have slightly different analysis of the required delay, and thus generate different output streams.

The delay is thus taken as constant and equal for all the elementary streams of a transport stream. This enables to preserve the overall structure of the transport stream; for instance, if the audio and video are sent synchronized in two elementary streams, they are kept synchronized, although both delayed.

Furthermore, bursts of filtered elementary streams will be sent at the same times (i.e. multiplexed) only if they are already multiplexed in the input transport stream. This simplifies and limits the variation of the output bandwidth.

Figure 1:
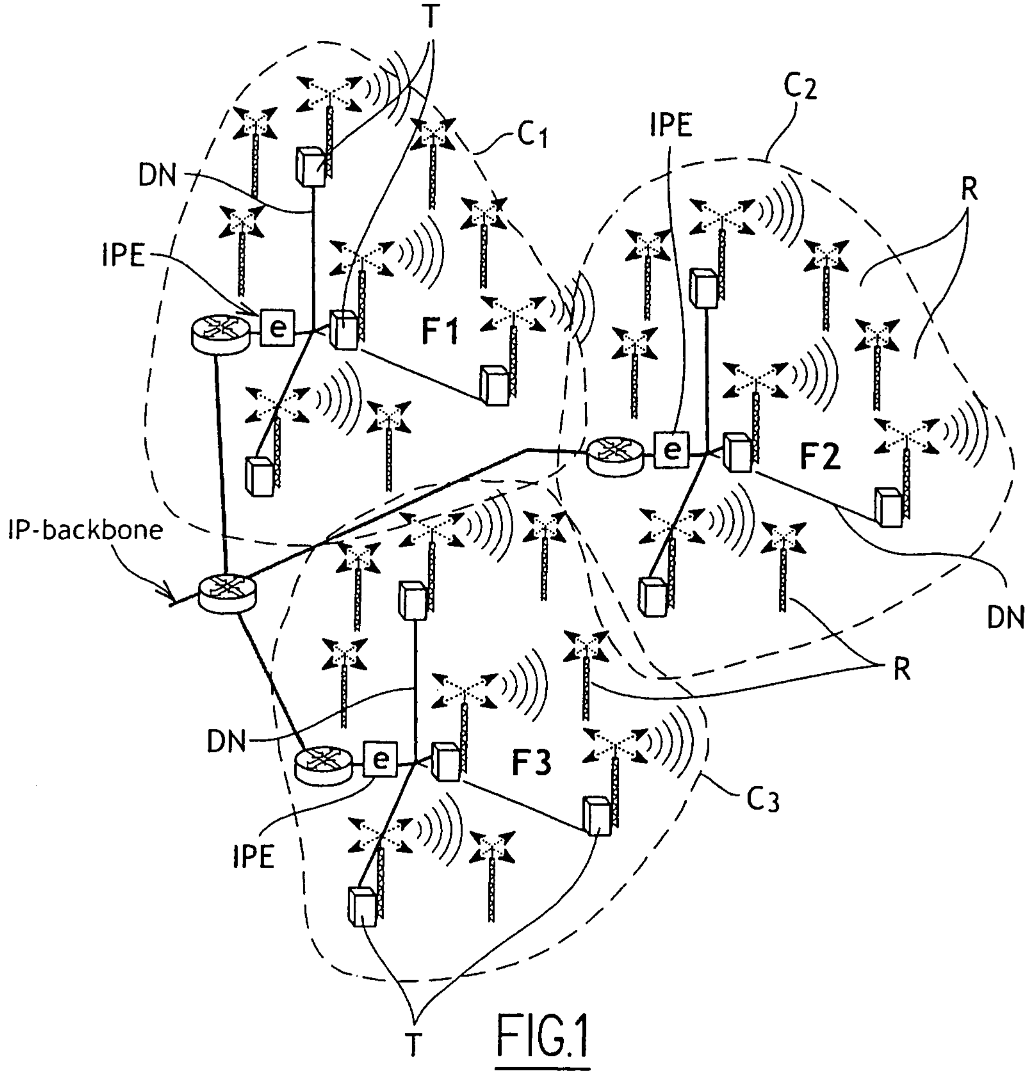
Figure 2:
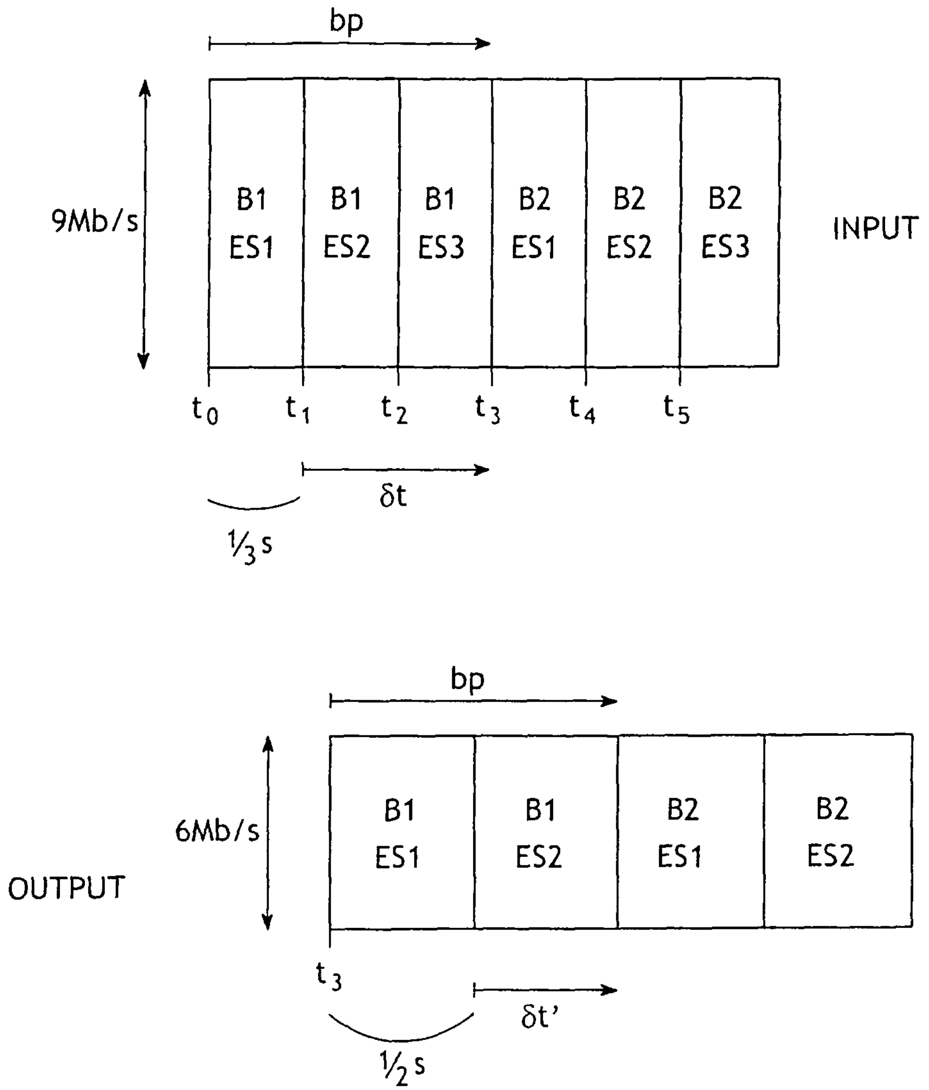
FIG. 2 represents an example of the burst scheduling modification performed in accordance with the first embodiment of the method according to the invention.

FIG. 2 represents a simplistic example of the burst scheduling modification operated according to this first embodiment.

The SDR receives as input a TS comprising three elementary streams ES1, ES2 and ES3. Successive bursts B1, B2 of the ES are represented. In this example, the burst are sent periodically (every second), and each has a rate of 9 MB/s and a duration of ⅓ second.

The filtering operation performed by the SDR here consists in filtering out the elementary stream ES3, so as to generate an output transport stream comprising elementary streams ES1 and ES2 at an adapted rate of 6 Mb/s.

The bursts are thus of duration ½ second in the output TS.

The output of the first burst B1 of ES1 is delayed until the next burst B2 of ES1 is received, that is until t3. The arrival of B2/ES1 is detected and the interval bp between the beginning of B1/ES1 and the beginning of B2/ES1 in the input stream is calculated. The interval δt (⅔s) between the end of B1/ES1 and the beginning of B2/ES1 in the input stream is also calculated.

From these intervals bp and δt, and the difference between input and output bit rates, the MPE timing to be set within each MPE frame of B1/ES1 in the output transport stream is computed. Values for this MPE timing decreases in the successive MPE frames from bp (1 s in our case) for the beginning of B1/ES1 to δt' (½s) for the end of B1/ES1.

According to a second embodiment, the SDR comprises means for determining the MPE timing information in the input transport stream, and the bursts scheduling modification consists in rearranging the bursts in the transport stream structure to enforce the determined MPE timing of the input transport stream in the output transport stream to be generated.

According to this second embodiment, the accuracy and validity of the MPE timing information in the first MPE frame of a burst already transmitted is preserved and there is no need to compute a new MPE timing information for this first MPE frame.

The MPE timing information in the following MPE frames of the burst are then adjusted so as to take into account the difference between output and input bandwidths.

Before transmitting a burst, its scheduled departure time is compared with the time announced in the previous burst.

If the burst has arrived too early, it is delayed until the announced time. The structure of the transport stream has thus to be modified, for instance by inverting bursts. It is also possible that there is nothing available to be sent at this time. If this is the case, NULL packets are sent until the situation goes back to order.

If the burst arrives within an acceptable time-frame [announced-time, announced-time+delta], it is processed and sent as scheduled.

If the burst arrives too late, it may be useful to insert a "fake" burst that will put the mobile receiver back to sleep until the burst arrival.

Figure 3:
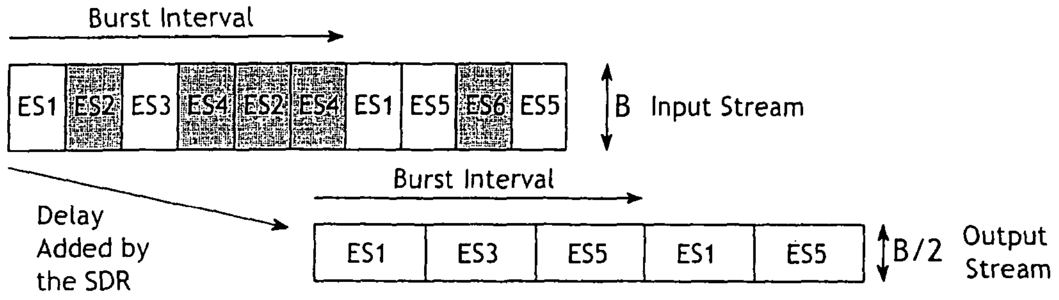
FIG. 3 represents an example of the burst scheduling modification performed in accordance with the second embodiment of the method according to the invention.

FIG. 3 represents a simplistic example of the burst scheduling modification operated according to this second embodiment.

The input transport stream at a rate B comprises elementary streams ES1-ES6. The filtering operation here also consists in filtering out the elementary streams ES2, ES4 and ES6, and the SDR generates an output transport stream comprising elementary streams ES1, ES3 and ES5 at a rate of B/2.

FIG. 3 shows that the enforcement of the inter-burst delay, for instance between bursts of ES1, may cause burst re-ordering.

According to a preferred embodiment of the invention, a mix is performed between the first embodiment and the second embodiment.

The first embodiment with a predefined constant delay provides a preservation of the stream structure and an accuracy of the computed MPE timings. However, in order to keep this delay short, there are situations for which a burst has to be sent without yet having the appropriate timing information. The second embodiment is thus performed for bursts whose interval is large, the MPE timing of the first MPE frame being preserved and later unforced.

According to this preferred embodiment, the burst scheduling modification comprises the operations of:

- when receiving a burst B of an elementary stream, delaying the output of said burst B by a preset time interval D;
- once said preset time interval D has elapsed,
  - if the next burst B+1 of said elementary stream has been received then,
    - detecting the arrival of said next burst and calculating the interval separating the bursts;
    - computing, from said interval, the MPE timing information to be set for said burst B in the generated output transport stream;
  - otherwise, determining the MPE timing of the first frame of said burst B in the input transport stream and enforcing said MPE timing to the first frame of said burst B in the generated transport stream, the MPE timing of the following frames of said burst B in the generated output stream being adjusted so as to take into account the difference between output and input bandwidths.

In other words, the transport stream is delayed by a delay D (constant and equal for all the elementary streams). If the bursts interval is lower than D, the next burst is received on time for the MPE timing to be computed accurately and the transport stream structure is preserved. On the contrary, if the bursts interval is higher than D, the burst will be sent before knowing when the next burst will be available for transmission. The MPE timing is adjusted and the departure time of the next burst remains unchanged and is enforced.

It has to be noted that:

- by setting the delay D to 0, one implements the above discussed second embodiment; and
- by setting the delay D to 40.96 seconds, one implements the above discussed first embodiment.

The present invention thus notably allows for adapted contents to be broadcasted within a cell despite the fact that the same stream is delivered (for instance via a satellite link) to all the cells.

Returning to FIG. 2 (same comments also applying for FIG. 3), let's consider that the input stream carries a national program (for instance ES1) and two local contents (ES2 and ES3). In a first cell, local content ES3 can be filtered out by a SDR installed in this first cell so that only national content ES1 and local content ES2 are broadcasted in this first cell. On the contrary, local content ES2 can be filtered out by a SDR installed in a second cell, so that only national content ES1 and local content ES3 are broadcasted in this second cell.

Returning to the description of the DVB-H network topology, one or more SDRs can be installed within a cell (although a SDR can belong to one or more cells).

An SDR has to be synchronized with a very high precision to the other SDRs of the same cell, and the output stream generated by the SDR has thus to be a deterministic function of the input stream.

In other words the same exact output stream (both in term of content and timing) has to be generated by all the SDRs of the cell.

The high level of precision in the synchronization does not mean necessarily that all the SDRs in a cell are doing the same thing at exactly the same time. It means that, at least, all the SDRs in the same cell are doing the same operations on the input data and produce exactly the same output data containing accurate MIP timing information that allows all the linked demodulators to play each MPEG-2 packet of this common (to the cell) TS at exactly the same time (for instance, at a classical precision of 100 ns).

Within the framework of the present invention, we want to make sure that all the SDRs within a cell produce the same output from the same input. However, transforming the transport stream (for instance via a filtering operation) is not as straightforward as transforming individually MPEG-2 packets, since the transformation exploits dependencies between these packets.

The invention proposes to make use of synchronization points within the transport stream, and to transform data units larger than single MPEG-2 packets thanks to the timing information provided by the synchronization points.

The data between two synchronization points is hereafter called an Elementary Unit.

The invention proposes for instance to use a megaframe as such an Elementary Unit. Megaframes indeed contain synchronization points under the form of the megaframe Initialization Packet (MIP).

Let's consider IU(n) as the nth input Elementary Unit and OU(n) as the output Elementary Unit corresponding to the transformation of IU(n):

OU (n)=f (IU(n), IU(n−1), . . . IU(n−p+1), S(n)), where S(n) is the state of the SDR at that time, i.e. what it contains in its memory.

The state S depends only on a pre-determined finite number of past IU (in particular in order to render possible the synchronization of the states):

$$S(n)=g(IU(n),IU(n-1),IU(n-2), \ldots IU(n-q+1),C),$$

where C represents the active static configuration, i.e. the part of the configuration that actually impacts the system behavior.

It shall be noted that a passive static configuration C' can also be considered which is for example a secondary configuration or a new version of the software in preparation (ready to be activated for instance through an in-band configuration message which will be discussed below).

A configuration can be represented either as table giving particular values to configuration variables or by a set of configuration commands (for instance a configuration script). It is possible to derivative a configuration script from a configuration table and vice versa.

A sufficient number (p) of Elementary Units are buffered within a buffering unit of the SDR to resolve data dependencies. It has to be noted that the delay added by the SDR to the transport stream can be all the more significant as the buffering unit is large.

A sufficient number (q) of elementary units that need to be processed before states are synchronized and output can be activated can be stored in a dedicated initialization unit.

Exemplary software coding of a possible embodiment of the method according to the first aspect of the invention reads as follows:

```
Parameters:
Delays below are expressed in number of packets, i.e. a packet
<n> is delayed by <d> if it is being sent while packet <n>+<d>
is being received.
- D is the fixed delay added by the SDR
- B is the variable delay enforced at synchronization points
- A is the maximum variable delay added by the SDR
- S is the synchronization delay
- N_i / N_o is the bandwidth ratio between input and output,
e.g. N_i is the size of an elementary input unit and N_o is
the size of the corresponding elementary output unit.
Constraints:
- B < A
- B < S
Variables
- I: Number of packets received = Input packet number
- O: Number of packets sent
- N: Output packet number
- I_sync: Value of I at last synchronization point
- O_sync: Value of O at last synchronization point
- IS: Value of I at next synchronization point
main_loop
Init( )
FOR-EVER
    Input( )
    while ((I−Isync)*N_o > (O−O_sync)* N_i)
        Output ( )
END-FOR
Init( )
    I=0, O=0, I_sync=0, O_sync=0
Input( )
- I++ ; Read MPEG2 packet number I
- IF MPEG2 packet is a synchronization packet
        schedule Synchronization (IS=I+S)
- IF Synchronization expires now (I=IS)
        Synchronize( )
- IF packet should be filtered
        Discard packet
- ELSE
        Enqueue MPEG2 packet tagged with number I in Queue #PID
(before a potential Queue marker at the tail of the queue if
the packet still belongs to the same burst)
Output( )
- Flush Packets Older (i.e. whose number is smaller) than I-D-
A
- Find Queue whose Head has the smallest packet number N (is
unique)
- If N > I-D-B AND Synchronization is scheduled (I < IS)
  OR N > I-D (Packet is not old enough)
        - Send(NULL)
   ELSE
   - If packet is a 'Queue marker'
         - Unqueue marker
```

-continued

```
  ELSE
  - If Next Burst exists in the Queue
    AND Next Burst First Packet Number NN – N < D (first
embodiment)
        - Compute MPE-Timing based on packets present in the
queues
        - Unqueue and Send(Packet)
  ELSE (Second embodiment)
          - Insert 'Queue Marker' tagged with packet number N +
T
            before the next burst. If Queue Marker exists, update
it
              with (Max(OldValue, N+T))
            (T is the announced MPE-Timing burst interval in
packets)
        - Update MPE timing to keep the start of the next burst
unchanged, accounting for the difference between input and
output bitrates
        - Unqueue and Send(Packet)
Synchronize( )
- Flush Packets Older (i.e. whose number is smaller) than I-D-
B
  from Head of Queues
- I_sync = I
- O_sync = O
- Is = 0
Send(Packet)
- If still within the initial 40.96 s + 1 synchronization
  interval
  - Ignore transmission
  ELSE
          XMIT Packet
- O++
```

The above algorithm provides with a deterministic output of the SDR once its initialization period is completed whatever the time the SDR was powered up.

Indeed, the content of the queues are completely determined: it contains all the packets of the elementary stream, and the queue markers inserted between burst separated by more than D packets are completely known by the SDR after 40.96 seconds of initialization.

The packets in the system after a synchronization point I are all the non-filtered packets in the input stream and all the queue markers whose numbers are contained in the [I, I-D-B] interval (or [I, I-D-A] for packets followed by a marker in the [I, I-D-B] interval). The content of the buffers are thus completely determined in all the SDRs at a synchronization point.

Let's define the current packet delay by the packet number difference between the output and the input (N−I). The algorithm maintains the current packet delay between D and D+A. The synchronization process enforces this delay to D+B, by inserting NULLs before the synchronization point if this delay is too small or by dropping packets is it is too large, thus making sure that all SDR who have sufficient knowledge of the past send exactly the same output on reception of a given packet I.

The above described algorithm can be improved in several ways, for instance by:

- minimizing the impact of packet drops, by anticipating losses, dropping preferably NULLs, and then MPE-FEC transport packets, etc. . . .
- remodelling bursts to optimize burst durations, especially when these are interrupted by a re-scheduled burst.

The SDR also comprises means for performing SI table rewriting. Indeed some of the above listed operations performed by the SDR may affect PSI/SI contents.

PID Filtering

All the PMTs (Program Map Table) entries pointing to the filtered PID must be removed. The same applies for EIT (Event Information Table) entries.

If the removed PID is the last elementary stream of one or more services in any PMT, then the corresponding services must be also removed from PAT (Program Association Table) and the corresponding PMT must be removed also. The same applies for EIT. The IP/Mac Notification Table (INT) is also updated by removing all the Slash descriptors pointing on removed entries in PMTs.

IP Filtering

All the Slash Descriptors corresponding to the filtered address must be removed from INT (IP/MAC Notification Table) and when the last slash descriptor of a target descriptor loop is removed, the associated time_slice_fec_identifier_descriptor and IPMAC_stream_location_descriptors are also removed.

These descriptors identify a TS, Service and component_tag. In this case the PMT for this service must be updated and the corresponding component_tag entry removed. The same applies for the EIT. In the case the removed elementary stream is the last for this service, then the entire PMT is removed and the PAT entry for this service is also removed.

PID Translation

It requires the update with the new PID value of the PID field in the corresponding MPEG-2 packets and also the update of the PMTs entries related to the old value of the PID.

IP Address Translation

It requires the update with the new value of the source and destination IP addresses of the appropriate MPE sections and the computation of the Transport (UDP) checksums. This functionality can be usable on non crypted IP streams and requires updating the INT IPv4/v6 Slash descriptors with the new values.

DVB Object's Values Translations

The corresponding values in the appropriate table (NIT—Network Information Table, INT, EIT) must be updated, as well as the TPS bits in MIP.

One describes hereafter a possible embodiment of the enforcement of megaframe and MIP coherence within the generated output TS.

In order to do so, the following operations are performed:

- the inverted sync bytes on the non filtered packets of the input transport stream are removed, for instance by reversion of these inverted sync bytes;
- MIPs are inserted at the appropriate place in the generated output TS, these MIPs having accurate values for each field and especially for the STS pointer and maximum_delay timing fields (these values being computed from scratch or by updating values from the MIPs in the input stream).
- inverted sync bytes are inserted in the header of the first packet of each megaframe on the output stream.

In order to proceed with MIP and megaframes, standards and state of the art envisage that the SFN adapter uses the start time modulo $10^7$ for STS and the delay to reach the most remote transmitter for maximum_delay. maximum_delay has to be lower than 1 s, which results in forcing to one second the maximum transit time between the SFN adapter and each modulator of the distribution chain.

However, the Applicant has established that, if the transit delay varies in a distribution network between dmin and dmax; it is possible at the level of the SFN adapter, without altering the flow validity, to use start time+dmin modulo $10^7$ for STS, and dmax-dmin for maximum_delay.

Hence the one second constraint does not relate any more to the delay of the longest path, but to the delays variation between the longest and shortest paths.

Alternatively, if within a network carrying a stream with MIP and megaframe, a device is added with introduces a delay comprised between dmin and dmax, and if anywhere in the network, the MIPs are modified according to STS=(STS+dmin) mod $10^7$ and maximum_delay=maximum_delay+(dmax−dmin)<1 s, then the stream remains pertinent.

Returning to the description of the enforcement of megaframe and MIP coherence in the output TS, it has to be noted that the SDR knows at any time the length of the megaframe (number of packets unit) for both the input and output streams. Indeed, as already explained above, these values can be provided by configuration parameters or computed from transmission parameters. The value for the input stream can be also derived from an analysis of the input stream (looking for inverted sync bytes in TS-packets headers)

The operation of reverting inverted sync bytes in the input stream can be performed at the level of the means 10 (see FIG. 4) of the SDR. These means 10 also provide a way to obtain a copy in a buffer of the last MIP in the input stream and to discard MIPs.

The operation of inserting MIPs in the output stream can be done at the level of means 30. MIPs are inserted in the output stream at a fixed or at a pseudo random place thanks to a configuration parameter (the periodic_flag in MIP being set accordingly). "pseudo random" means that two SDRs in a same area can be instructed to send MIPs at a variable place p in the megaframe, p being or not the same for all SDRs in an area). The pointer value is computed from the length of the megaframe in the output stream and the number of packets already sent in this megaframe.

STS and maximum_delay for this MIP are computed as explained below, depending upon the SDR having or not a "one pulse by second" (pps) reference signal.

Let's consider the case where the SDR has an input pps reference signal with an accuracy of dt1 (100 ns unit). This means that the one pps signal delivered by the timing system (e.g. GPS) at the absolute time t is taken into account by the SDR at an absolute time t1 where t<t1<t+dt1. Consider mdt1 as a value greater than the maximum value of dt1 for each SDRs in an area. Thanks to the one pps reference signal, each SDR knows that it is processing the MIP at a time tmip relative to the last pulse and that the absolute time of this event atmip is between atpps+tmip (absolute time of the last pps+tmip) and atpps+tmip+dt1 (atpps+tmip<atmip<atpps+tmip+dt1).

According to the current transmission parameters of the output stream, the SDR also knows exactly the time ttmpg needed to transmit an MPEG-2 Packet, and thanks to the current MIP pointer, the number p of packets that must be sent before sending the first packet of the next megaframe.

Thus the SDR can predict that the first packet of the next megaframe will be sent at a time tfm after the MIP transmission with:

p*ttmpg<tfm<p*ttmpg+dt2, dt2 being maximized for instance by the uncertainty on the time spent by the SDR to send a complete megaframe.

As for mdt1, mdt2 is a value greater than the maximum of dt2 for all the SDRs in an area.

The SDR also knows (via configuration) mdmin and mdmax, these values being, respectively for all the SDR in an area, (mdmin) a value lower than the minimum and (mdmax) a value greater than the maximum values for the delays for transmitting and processing a MPEG-2 packet on the chain from the output interface of the SDR to the transmitting antenna.

Thanks to a configuration command, each SDR operates with the values of mdt1, mdt2, mdmin and mdmax of a given area and mdm=mdt1+mdt2+mdmax The timing fields in the MIP can be set as follows max_delay=mdm $$STS=(tmip+p*ttmpg) \text{ modulo } 10^7$$

The above fields are not valid if mdm>$10^7$ since max_delay should not exceed 1 s. However, based on the argument described above, the MIP fields remain valid if mdmin is added to the STS field and mdmin is subtracted to the max_delay field. Thus, the timing fields in the MIP should preferably be set as follows:

max__delay= mdm−mdmin
STS= (tmip + p*ttmpg +mdmin) modulo $10^7$.

Another method for computing the timing fields in the MIP consists in evaluating the time at which the current megaframe begins (tmg) rather than the time at which the MIP is to be inserted (tmip). This requires adjusting the number p of packets to the next megaframe to the number of packets in a megaframe (M). This results in having:

max__delay=mdm−mdmin
STS=(tmg+M*ttmpg+mdmin)modulo $10^7$.

Let's now consider the case where the SDR does not have an input pps reference signal. In such a case, the SDR may for instance extracts its reference timing information from the MIPs in the input stream.

When the SDR, after having received a MIP frame with stsu in the STS field and mdu in the max_delay field, receives the first packet of the next megaframe at the absolute time ata, it can assert that:

$$attpsm+stsu<ata<attpsm+stsu+mdu$$

where attpsm is the absolute time of the pps when the megaframe was sent,

If attpsm is taken as the origin of the time, the above formula becomes:

$$stsu<ata<stsu+mdu$$

The SDR can use its inaccurate system clock to compute the time difference tio between this event ta and the time atmip where it needs to process a MIP in the output stream. This time difference is computed inaccurately and can thus only be estimated with a precision of dtio:

$$tio<atmip-ata<tio+dtio.$$

Thus, tio+stsu<atmip<tio+dtio+stsu+mdu

The here above timing fields setting can then be implemented with $$tmip=(stsu+tio) \text{ modulo } 10^7 \text{ and } dt1=dtio+mdu.$$

It has to be noted that dtio is in the same order of magnitude as dt1, whereas this is not the case for mdu. Hence values for dt1 (and mdt1) are expected to be greater in this case.

The two previous methods enables a SDR to enforce coherent MIPs and megaframes in the output transport stream. However, it is not guaranteed that all output streams will be identical. Indeed, if all SDRs share the same configuration values for mdm, mdu, etc. . . . , the evaluation of tmip in method 1 and tio in method 2 will differ from one SDR to the other.

A third method consists in evaluating tio in method 2 based on the number of packets nop received in the input stream between the time ata and atmip: tio=nop*ttmpg.

If all SDRs implement all the same deterministic algorithm, they will all have the same evaluation of nop and thus tio. Note that in this case, the SDR enforces MIP coherence with absolutely no external time reference.

The inversion of sync bytes in the first packet of each megaframe can be performed in the functional block 30, thanks to the pointer value of last transmitted MIP The others fields of the MIP (TPS bits, function loop) are derived from the corresponding values in the current active configuration and from some of the configuration commands described below (see the opcode change-value).

One describes hereafter a possible embodiment for configuring the SDRs. As the configuration of a SDR necessarily affects the generated output transport stream, the proposed possible embodiment makes sure that the SDRs within a cell are configured in a synchronized way.

The invention proposes to perform in-band configuration by using configuration messages within the input transport stream Configuration messages within the input transport stream are received and interpreted at the SDRs, and if applicable apply to the following packets of the input TS so as to modify the current configuration state of the SDR.

The invention proposes to transmit the in-band configuration messages within a data carousel. Configuration commands applicable to the different cells are sent cyclically in the carousel.

An example of a configuration message is as follows:

"area_id config_number command_number action opcode arguments", where:

- area_id identifies a group of SDRs to which the configuration command applies (and thus identifies the SDR or SDRs to which this command applies). SDRS can indeed be linked to groups comprising one or more SDR, thanks to a configuration command. Groups are known by an identifier, and an SDR may be part of more than one group. The group formed by a single SDR and the group formed by all the SDRs in a SFN cell are special groups of interest.
- config_number identifies the version number of the last configuration sent in the carousel.
- command_number is a counter set to zero each time a configuration is sent in the carousel, and incremented by one at each new configuration command; Discontinuities in this command number provide an indication on loss of configuration commands and allow the SDR to stop producing output until the next valid configuration is received in the configuration carousel stream.
- action: is a code indicating that the command is intended to update the configuration only, or is intented to be immediately executed without updating the configuration, or is intended to execute both the above operations.
- opcode identifies the operation code, for instance filter_pid (PID filtering operation), filter_ip (IP filtering operation) or change_value (translation operation), etc. Among the allowed opcodes is the opcode "activate" which results in activating the configuration given by the config_number on all the SDRS belonging to the area_id, thus activating in block all the previous commands having the action parameter set to "update configuration only".
- arguments, for instance 0x56 for filter_pid, TransportStreamId="456" for change_value.

This in-band configuration can be performed as multicast IP stream within a specific PID. This enables to externalize the SDR configuration function from the IPE, and thus to be IPE independent.

Configuration messages are carried by the input transport stream, and can for instance be located:

- in the payload of NULL transport packet;
- in a special transport packet with a specific PID;
- in the private zone of the MIP frame;
- by extension of the set of functions allowed in the function_loop of the MIP;
- in a special section in the space left unused in the transport packets of a ES (one PID);
- in one or more private sections;
- in a new PSI section.

While the invention has been described in relation with the processing of an input TS and the generation of an output TS, the invention is not limited to this specific example but also extends to the processing of a plurality of input TSs (the SDR thus receiving a plurality of input TSs) and the generation of a plurality of output TSs (the SDR thus generating and outputting a plurality of output TSs).

The invention claimed is:

1. A method for broadcasting a transport stream in a Single Frequency cell of a Multiple Frequency Network comprising multiple Single Frequency Network cells and a plurality of transmitters located in each of the cells, wherein the method comprises:

- generating, by a central IP encapsulator, a transport stream common to the entire Multiple Frequency Network and which comprises a plurality of elementary streams, each elementary stream being a set of transport stream packets having the same Packet Identifier, at least one of the elementary streams being time-sliced and sent in bursts, and timing information indicating within a burst a time to the beginning of a next burst,
- transmitting, by the central IP encapsulator, the common transport stream to the transmitters located in each of the cells,
- receiving, by each of the transmitters located in each of the cells, the common transport stream as an input transport stream,
- applying, by each of the transmitters located in one cell, a filtering operation to the input transport stream to filter out from the input transport stream part or all of one or more filtered time-sliced elementary streams;
- modifying, by each of the transmitters located in one cell, the input transport stream so that burst remodelling is carried out,
- modifying, by each of the transmitters located in said one cell, bursts scheduling of the input transport stream to compensate for removal of the filtered time-sliced elementary streams such that the filtered input transport stream is modified to become a Digital Video Broadcasting—Handheld (DVB-H) compliant output transport stream which is the same both in term of content and timing for all the transmitters located in said one cell; and
- synchronously transmitting, by each of transmitters located in said one cell, the output transport stream to mobile devices within the cell at substantially the same time with a 100 nanosecond accuracy.

2. A method according to claim 1, wherein the bursts scheduling modification updates the timing information in the bursts of the output transport stream.

3. A method according to claim 2, wherein the method further comprises computing the timing information to be set for a burst of an elementary stream in the output transport stream from an interval separating the burst and a next burst of the elementary stream in the input transport stream received by a processing apparatus.

4. A method according to claim 3, wherein updating of the timing information of each burst is performed by:

receiving at the processing apparatus the burst of an elementary stream of the input stream;

delaying the output of the burst in the output stream until the next burst of the elementary stream is received at the processing apparatus;

detecting an arrival of the next burst in the input stream and calculating the interval separating the burst and the next burst; and computing, from the interval, the timing information to be set for the burst in the output transport stream.

5. A method according to claim 2, the method further comprising:

determining timing of the input transport stream; and wherein the bursts scheduling modification rearranges the bursts in the transport stream to enforce a determined timing of the input transport stream in the generated output transport stream.

6. A method according to claim 5, wherein:

Multiprotocol Encapsulation (MPE) timing information of a first frame of a selected burst in the input transport stream is enforced to the first frame of the burst in the generated transport stream, and MPE timing of following frames of the burst in the generated output stream is adjusted so as to take into account a difference between output and input bandwidths.

7. A method according to claim 2, wherein the bursts scheduling modification comprises:

when receiving the burst of an elementary stream, delaying output of the burst by a preset time interval;

once the preset time interval has elapsed, if the next burst of the elementary stream has been received then, detecting an arrival of the next burst and calculating the interval separating the burst and the next burst; and computing, from the interval, the timing information to be set for the burst in the output transport stream;

if the next burst of the elementary stream has not been received, determining Multiprotocol Encapsulation (MPE) timing of a first frame of the burst in the input transport stream and enforcing timing to the first frame of the burst in the generated transport stream, wherein the MPE timing of following frames of the burst in the generated output stream are adjusted so as to take into account a difference between output and input bandwidths.

8. A method according to claim 1, wherein the filtering operation comprises a Packet Identifier (PID) filtering operation of filtering out from the input transport stream an elementary stream identified by its Packet Identifier (PID).

9. A method according to claim 1, wherein the filtering operation comprises an IP address filtering operation of filtering out from the input transport stream part of a selected elementary stream identified by one or more IP addresses.

10. A method according to claim 1, wherein the method further comprises updating program specific information/service information tables.

11. A method according to claim 1, wherein the filtering operation further comprises:

a translation operation, an internet protocol address translation operation, and a Digital Video Broadcasting (DVB) object's value translation operation.

12. A method according to claim 11, wherein the translation operation is a Packet Identifier translation operation.

13. A method according to claim 1, wherein megaframes are formed by groups of input transport stream packets, and the megaframes are each time stamped using a megaframe initialization packet synchronization mark, wherein the method further comprises enforcing megaframe and megaframe initialization packet coherence in the generated output transport stream.

14. A method according to claim 13, wherein a first packet of a megaframe has an inverted sync byte, and the enforcement step comprises:

removing the inverted sync byte on non filtered packets of the input transport stream;

inserting megaframe initialization packets in the generated output transport stream; and inserting the inverted sync bytes in a header of the first packet of each megaframe on the output stream.

15. A method according to claim 1, wherein the method further comprises:

transmitting in-band configuration messages within the input transport stream; and interpreting the configuration messages by a processing device for determining the filtering operation to be applied.

16. A method according to claim 1, wherein:

the input transport stream is a DVB-H compliant transport stream, each DVB-H elementary stream carries Multiprotocol Encapsulation (MPE) sections, and the MPE sections are sent in bursts and MPE timing information indicating within a burst the time to the beginning of the next burst.

17. A method according to claim 1, wherein the input transport stream carries in-band configuration messages for interpretation by the transmitter for determination of the filtering operation.

18. A method according to claim 1, wherein the burst remodelling includes at least one of burst suppression, burst moving, burst multiplexing, burst demultiplexing, or burst insertion.

19. A transmitter for broadcasting multimedia content to mobile devices, the transmitter receiving a centrally generated transport stream common to an entire Multiple Frequency Network including multiple Single Frequency Network cells, the centrally generated transport stream being generated by a central IP encapsulator and received as an input transport stream by the transmitter located in one of the cells, the input transport stream having at least one time-sliced elementary stream, the transmitter comprising:

means operable to apply a filtering operation to the input transport stream to filter out from the input transport stream part or all of the at least one filtered time-sliced elementary stream;

means operable to modify the input transport stream so that burst remodeling is carried out;

means operable to modify bursts scheduling of the input transport stream to compensate for removal of the filtered time-sliced elementary stream such that the filtered input transport stream is modified to become a Digital Video Broadcasting-Handheld (DVB-H) compliant output transport stream; and means operable to transmit the output transport stream within the cell in which the transmitter is located in a synchronized way with the other transmitters and transmitting the output transport stream within the cell, so that all the transmitters within the cell transmit the same output transport stream to mobile devices within the cell both in term of content and timing at substantially the same time with a 100 nanosecond accuracy.

20. A device according to claim 19, wherein the input transport stream carries in-band configuration messages, and the transmitter is operable to interpret the in-band configuration messages for determination of the filtering operation.

21. A device according to claim 19, wherein the burst remodelling includes at least one of burst suppression, burst moving, burst multiplexing, burst demultiplexing, or burst insertion.

* * * * *